United States Patent [19]
Halls

[11] 3,722,194
[45] Mar. 27, 1973

[54] CONVERGING REEL ASSEMBLY HAVING A TINE CONTROL MECHANISM INCORPORATED THEREIN

[76] Inventor: Lawrence M. Halls, 567 East Jackson St., New Holland, Pa. 17557

[22] Filed: Dec. 30, 1971

[21] Appl. No.: 213,861

[52] U.S. Cl..........................................56/226, 56/1
[51] Int. Cl. ............................................A01d 57/02
[58] Field of Search....56/1, DIG. 1, 12.4, 12.5, 14.1, 57/14.2, 14.3, 14.4, 192, 219, 220, 221, 16.4, 226

[56] References Cited

UNITED STATES PATENTS

| | | | |
|---|---|---|---|
| 3,233,395 | 2/1966 | Dahl et al. | 56/192 |
| 3,241,301 | 3/1966 | Dyrdahl | 56/16.4 |
| 3,319,409 | 5/1967 | Landwebr | 56/220 |
| 3,338,036 | 8/1967 | Hurlburt | 56/14.4 |
| 3,400,526 | 9/1968 | Tuft | 56/220 |
| 3,472,008 | 10/1969 | Hurlburt | 56/226 |
| 3,512,348 | 5/1970 | West et al. | 56/226 |
| 3,555,796 | 1/1971 | Baumeister | 56/221 |
| 3,624,987 | 12/1971 | Lausch et al. | 56/1 |
| 3,664,101 | 5/1972 | Hurlburt | 56/220 |

*Primary Examiner*—Russell R. Kinsey
*Attorney*—John C. Thompson et al.

[57] ABSTRACT

In a mower-conditioner having a header with a sickle bar transversely mounted therein for cutting a swath of crop material of given width, a pair of transversely disposed conditioning rolls spaced rearwardly of said sickle bar and of less width than said sickle bar, a converging reel assembly mounted transversely above said sickle bar and adapted to engage a swath of crop material corresponding to the width of said sickle bar and converge that crop material into a narrower swath where the crop material may be readily received by said conditioning rolls. The converging reel assembly of the present invention generally comprises a pair of reel sections, each reel section rotatively mounted about one side of a transverse axis within said header and including outer and inner laterally spaced spiders with each spider having a plurality of radially extending spider arms. Each spider arm is pivotally mounted for movement in the direction of said transverse reel assembly axis. Corresponding spider arms of each reel section are interconnected by a tine bar with the tine bar being rotatively mounted therebetween and including a series of tines extending therefrom. A cam structure is fixedly disposed adjacent each outer spider and includes a cam track curved inwardly about the rear portion thereof adjacent said conditioning rolls. Each outer spider arm includes a cam following mechanism fixed thereto and confined within said cam track for moving the spider arms thereof back and forth in the direction of the transverse reel assembly axis as the reel assembly is rotated. A linkage structure responsive to the back and forth movement of the spider arms is connected to said tine bars and is operative to rotate the tine bars and consequently vary the attitude of the tines extending therefrom in response to the back and forth movement of selected spider arms.

18 Claims, 10 Drawing Figures

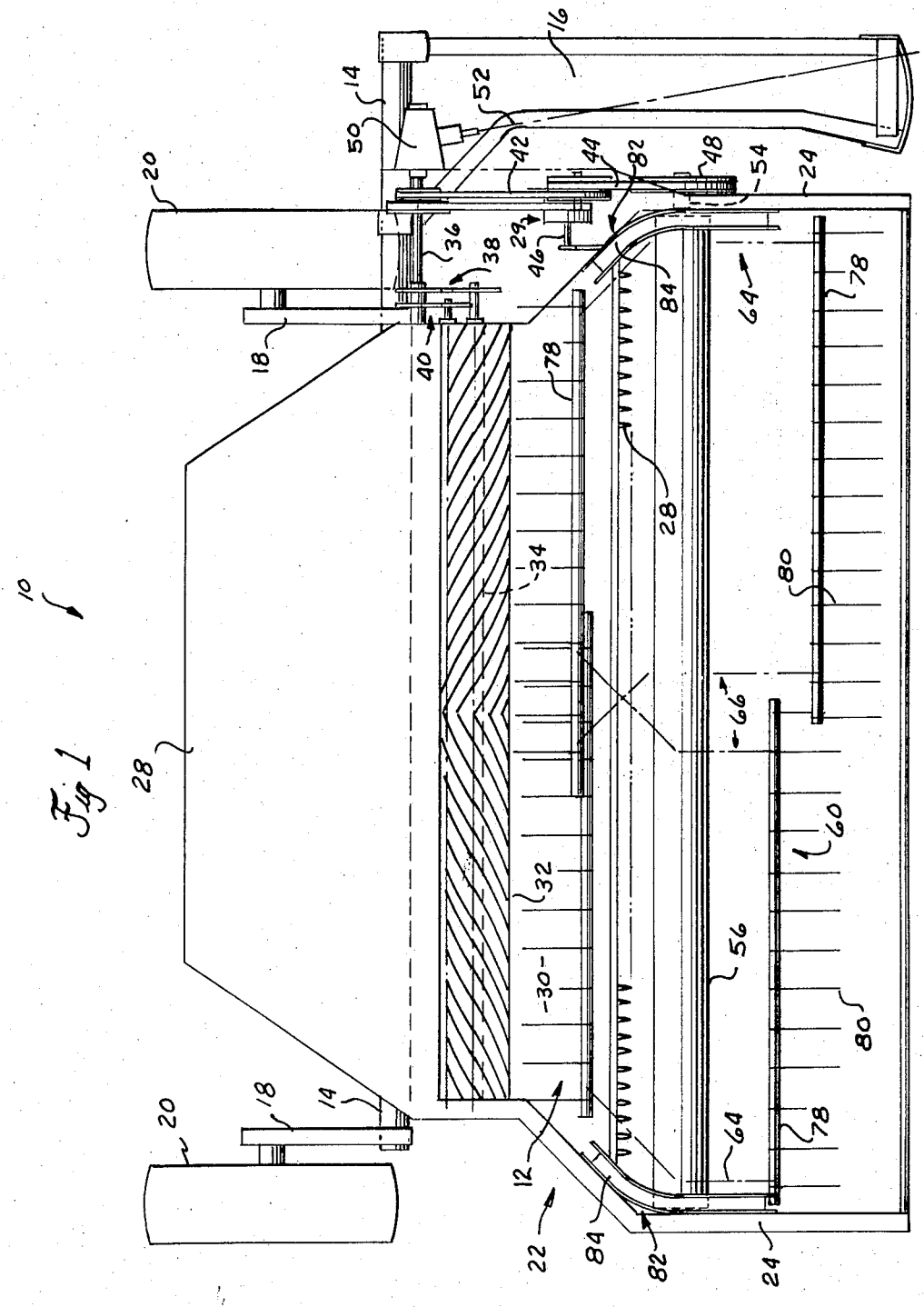

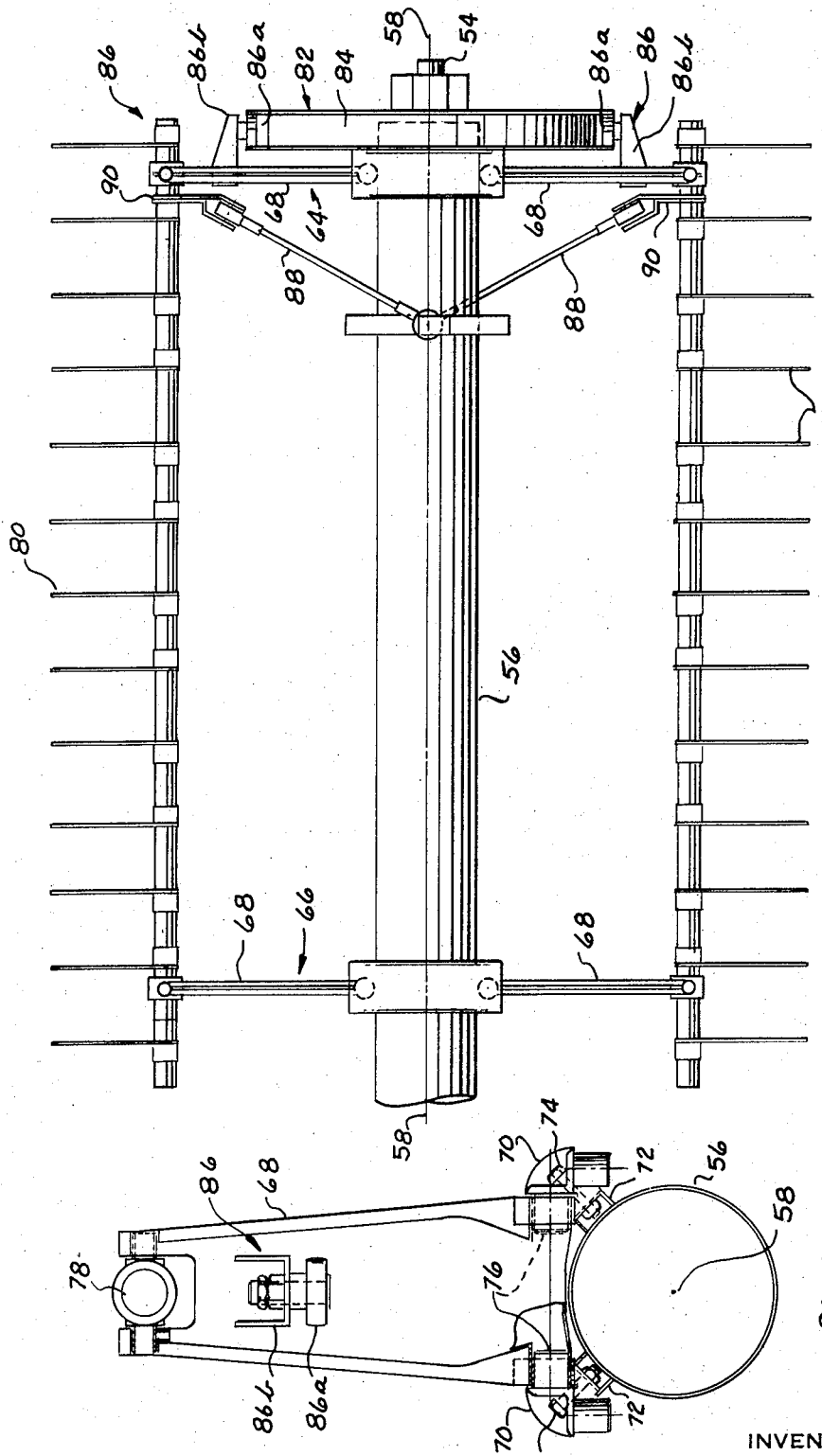

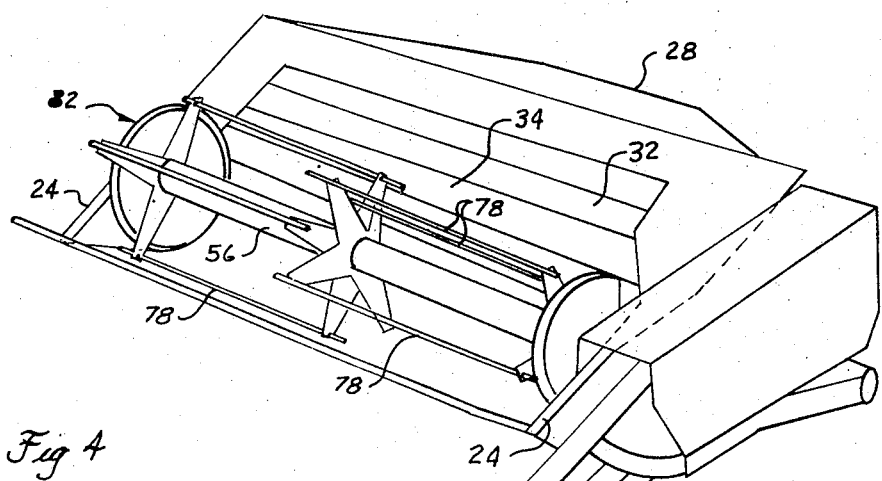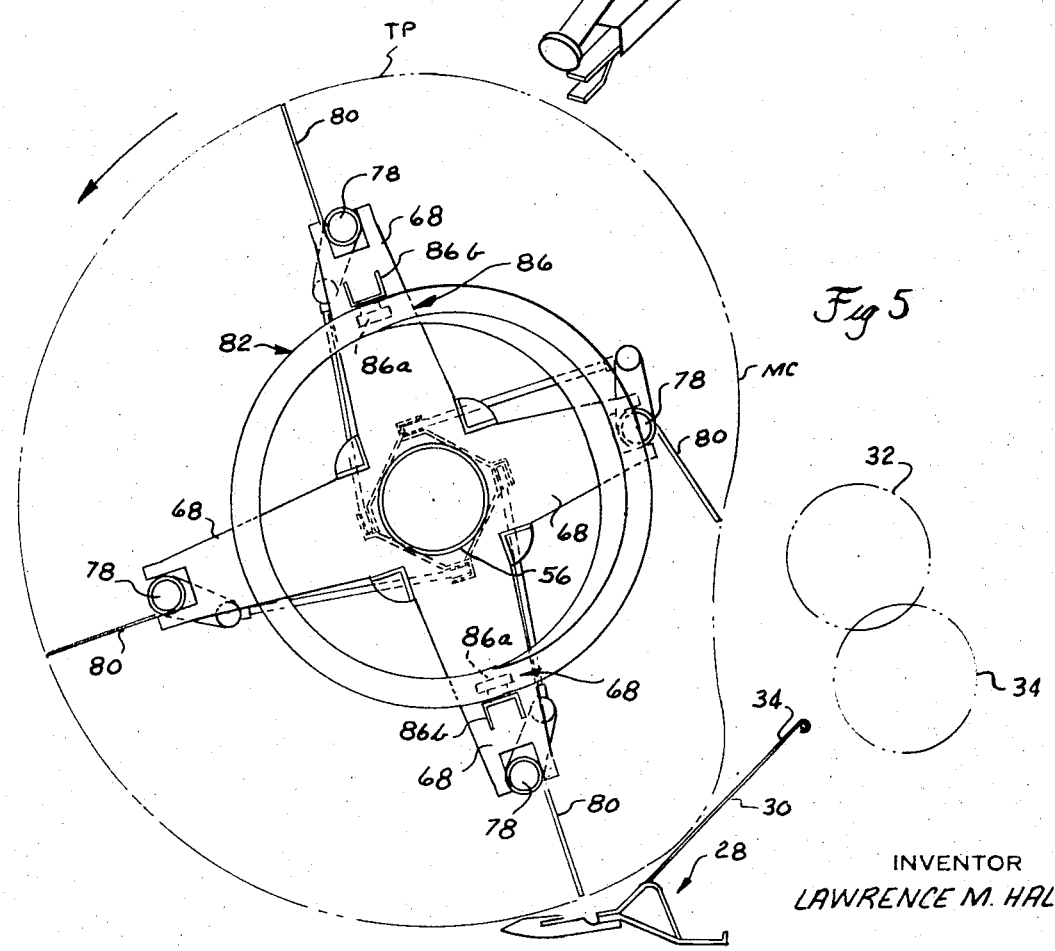

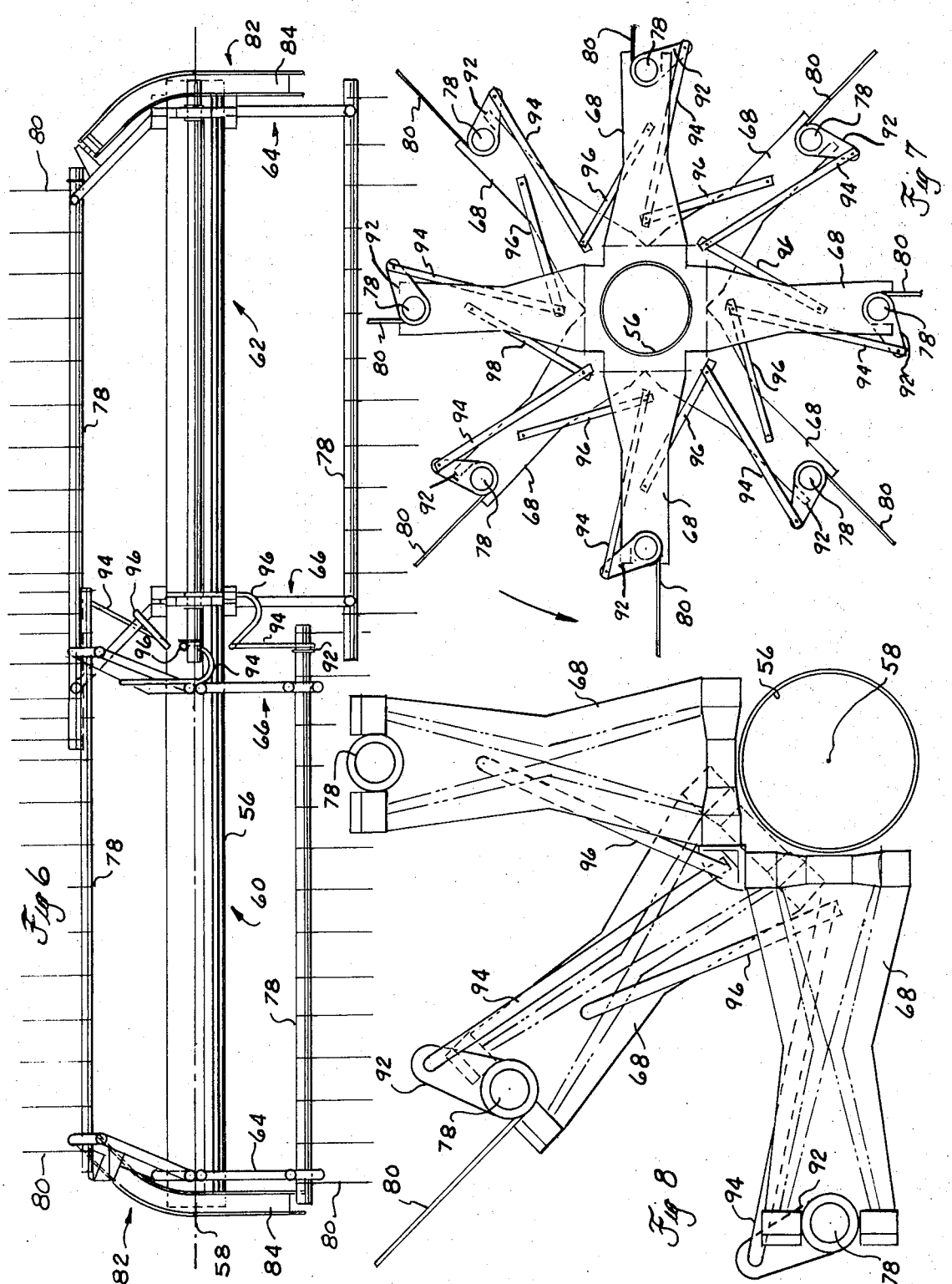

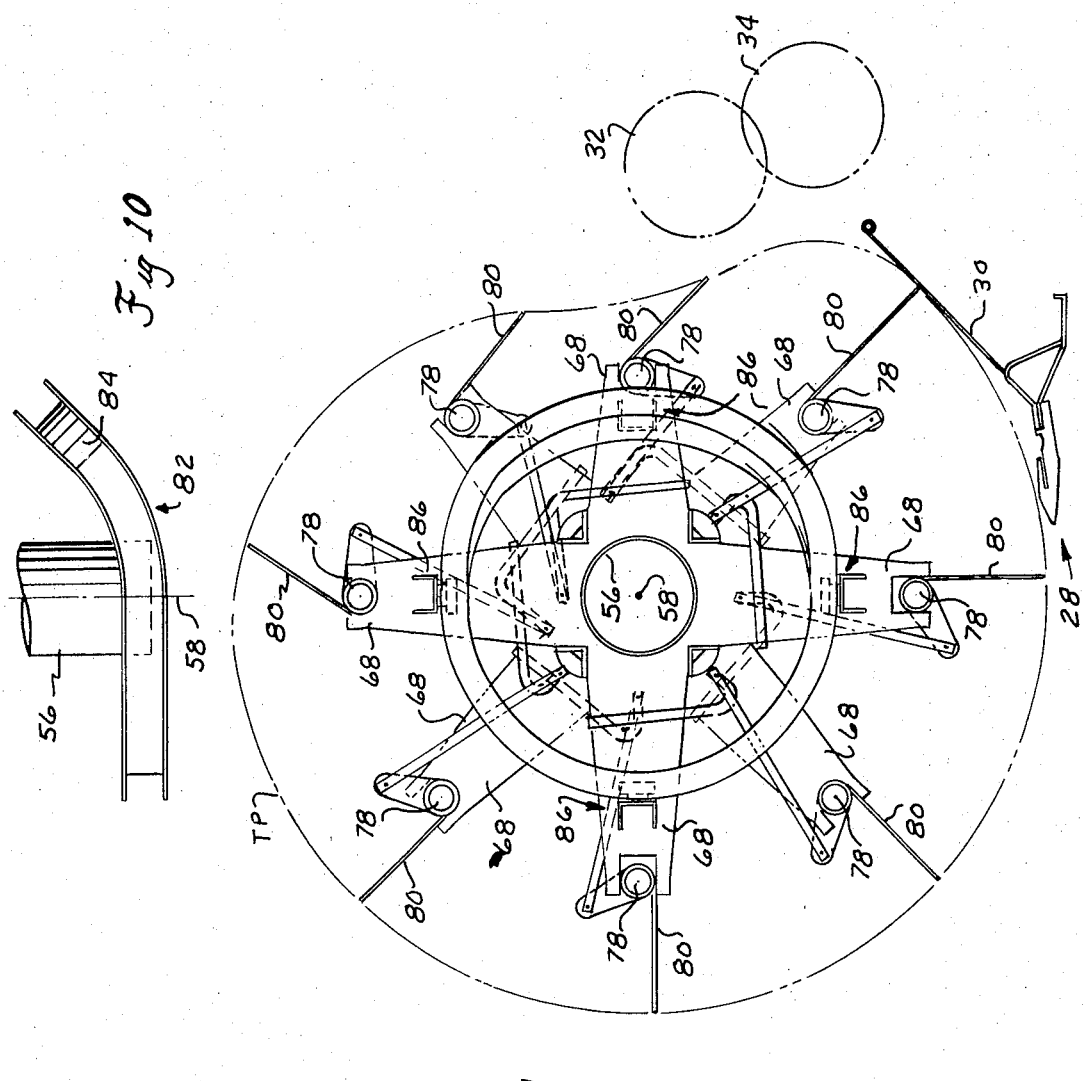

CONVERGING REEL ASSEMBLY HAVING A TINE CONTROL MECHANISM INCORPORATED THEREIN

BACKGROUND OF THE INVENTION

The present invention relates to agricultural harvesting machines and particularly to a reel assembly for gathering crop material and moving it rearwardly during a harvesting operation.

In U. S. Pat. No. 3,624,987 granted Dec. 7, 1971 to Henry W. Lausch and Bruce D. Schwalm, a mower-conditioner is disclosed therein which cuts a relatively wide swath of crop material and then, by the employment of an auger, consolidates that material into a narrow swath where the crop material is received by a pair of conditioning rolls which are of less width than the cutting width of the mower-conditioner. This basic concept of cutting a relatively wide swath of crop material and consolidating that material into a narrower swath that can be accommodated by conditioning rolls occupying a relatively narrow width within the mower-conditioner is a very feasible and desirable design in that it offers simplicity and, perhaps more important, economy. With respect to economy, conditioning rolls of less transverse width than the mower conditioner's cutting width certainly means less expense than if the conditioning rolls were full width, meaning approximately the same width as the cutting means. Moreover, the shorter rolls allow the rear of the header to be smaller, and in the case of a self-propelled mower-conditioner, enabled the header to be powered by a narrow tractor. Thus, in terms of economy, the crop consolidating or, as will become apparent later, converging concept presents many worthwhile advantages.

Referring back to the disclosure of U. S. Pat. No. 3,624,987 although the commercial version of the mower-conditioner shown therein has been successful, it, nevertheless, is apparent that the employment of a separate auger to consolidate the crop material adds cost and weight to the header of the mower-conditioner. Also, the presence of the auger within the header dictates that the reel and cutter bar be spaced a substantial distance forwardly in the header. Therefore, to balance the auger type header, counter weights must often be added to the rear portion of the header, or in the case of a self-propelled mower-conditioner, the tractor used for powering the header must be provided with counter weights or be of substantial weight itself.

It is therefore a principle object of the present invention to provide a mower-conditioner header with a converging reel for converging a given relatively wide swath of crop material into a narrower swath, thereby obviating the necessity of a consolidating auger.

Another principle object of the present invention is to provide a converging reel having a tine control mechanism that is operatively responsive to the converging action of the reel.

A further principle object of the present invention resides in the provision of a mower-conditioner having cutting means transversely disposed therein and a pair of rearwardly spaced conditioning rolls and a converging reel assembly having tines associated therewith that normally extend radially with respect to the reel assembly, said converging reel assembly including a mechanism incorporated therein for varying the attitude of the tines associated with said converging reel as said reel assembly is rotated. In particular, the control mechanism for varying the attitude of the tines associated with said reel assembly is particularly adapted to retard the tines as the tines sweep the cut crop material upwardly adjacent the conditioning rolls, the retarded tines when spaced adjacent said conditioning rolls allow the crop material to move more freely therefrom into the throat of the conditioning rolls where the crop material is conditioned.

A more particular object of the present invention resides in the provision of a dual reel section assembly with each reel section comprising an outer and inner spider with each spider including a plurality of radially extending arms with each arm pivotally secured about the axis of rotation of said reel sections for movement back and forth in the direction of said reel axis, corresponding arms of each reel section being interconnected by a tine bar carrying a series of tines radially extending therefrom; a cam structure fixedly disposed adjacent each outer spider and operatively connected thereto by a cam following mechanism, each cam structure including a cam track that has a portion thereof angled inwardly such that as said reel sections are rotated the spider arms are constrained to move back and forth in the direction of the reel assembly axis of rotation, thereby giving rise to a converging effect; and wherein a linkage structure is interconnected between each tine bar and a point and operatively responsive to the movement of a selected spider arm for rotating said tine bar and varying the attitude of the tines carried thereby during the rotation of each reel section.

In particular, a further object of the present invention is to coordinate the converging action of the reel with the tine control mechanism such that the tines are selectively controlled during the maximum convergence of the reel.

With respect to the above object, it is the object of the present invention to provide a converging reel with staggered spider arms and to allow selected spider arms to control the attitude of the tines being carried by a preceding spider arm, thereby providing a delayed response to the converging action of the reel which in the case of the generally circular cam track utilized in the present invention for convergence results in tine attitude control at approximately the point of maximum reel convergence.

A more particular object of the present invention resides in the provision of a dual reel section assembly coaxially mounted for rotation about a transverse axis within a mower-conditioner having a cutting means transversely disposed therein and a pair of conditioning rolls of less transverse width than said cutting means spaced generally behind said reel assembly and cutting means, said dual reel section being adapted to engage a relatively wide swath of crop material and move the material rearwardly past said cutting means and upwardly towards said conditioner rolls while simultaneously converging the crop material into a relatively narrow swath to be accommodated by said conditioning rolls, each of said converging reel sections being provided with a tine attitude control mechanism for varying the attitude of the tines carried by the two reel sections from a normal radial position relative to the reel to a retarded position during the convergence of the reel and when the particular tines involved are disposed adjacent the throat of the conditioning rolls, thereby providing a direct positive feed to the conditioning rolls.

Other objects and advantages of the present invention will become apparent from a study of the following description and the accompanying drawings which are merely illustrative of the present invention.

BRIEF DESCRIPTION OF THE DRAWINGS

FIG. 1 is a plan view of a pull type mower-conditioner having the converging reel of the present invention mounted therein.

FIG. 2 is a fragmentary plan view of one side of the converging reel, showing particularly the tine attitude control linkage structure.

FIG. 3 is a fragmentary side elevational view of a spider of a particular spider assembly.

FIG. 4 is a perspective view of the pull type mower-conditioner shown in FIG. 1.

FIG. 5 is a side elevation view of an outer spider assembly and an associated cam track particularly illustrating the tine tip path.

FIG. 6 is a plan view of a second species for the converging reel of the present invention.

FIG. 7 is a side elevational view of the inner spider assemblies of the converging reel of the second species, showing the interconnected linkage mechanism for controlling the attitude of the tines.

FIG. 8 shows an alternate type of construction for the spider arms.

FIG. 9 is basically a side elevational view of the converging reel of the second species showing the tine tip path; also FIG. 10 includes a plan view of the cam structure and a fragmentary view of the main tube of the converging reel.

DESCRIPTION OF THE PREFERRED EMBODIMENT

With reference to the drawings, particularly FIGS. 1 and 4, a pull type mower-conditioner, indicated generally by the numeral 10, is shown therein and includes a converging reel 12, the converging reel shown in FIGS. 1 and 4 being the first of two species disclosed by applicant. Pull type mower-conditioners, such as shown in FIG. 1, are known in the art as evidenced by the disclosure of U. S. Pat. No. 3,608,286 to H. N. Lausch et al., and since the present invention is not directed to a mower-conditioner per se but to a converging reel therefore, it is thought that a general description of a mower-conditioner will suffice. In this regard, the mower-conditioner 10 of FIGS. 1 and 4 comprises a generally L-shaped main frame including a transverse support member 14 with a fore-and-aft extending hitching beam 16 secured to one end thereof and extending therefrom where a forward end portion, now shown, is adapted to be coupled with a tractor, not shown. Fixed to said transverse support member 14 in spaced apart relationship and extending rearwardly therefrom are a pair of wheel arms 18. Each wheel arm 18 has a rear wheel 20 rotatively mounted therefrom.

Carried by the main frame of the mower-conditioner 10 is a header, indicated generally by the number 22. The basic frame structure of the header 22 includes a pair of laterally spaced side sheets 24 and a rearwardly extending windrow shielding structure 26. Conventionally provided within the forward portion of the header 22, between the side sheets 24, is a reciprocable cutter bar 28 and a floor plate 30, the floor plate being mounted behind the cutter bar 28. Rotatively mounted behind said cutter bar 28 and floor plate 30 is a pair of crop conditioning rolls, an upper roll 32 and a lower roll 34. It will be observed (FIG. 1) that the transverse width of the conditioning rolls 32, 34 within the header 22 is less than the cutting width of said cutter bar 28 as the outboard ends of each conditioning roll terminates inwardly of the outer extremities of both the cutter bar and converging reel 12. Thus, it becomes necessary to converge the swath of crop material cut into a narrower swath that can be accommodated by the conditioning rolls 32, 34. To accomplish this, the converging reel 12, to be subsequently described in detail, is rotatively mounted transversely within said header 22 above said cutter bar 28 and forwardly of the conditioning rolls 32, 34.

The elements of the header 22, i.e., cutter bar 28, reel 12 and conditioning roll 32, 34, are preferably driven from the tractor's PTO through a side drive arrangement, as shown in FIG. 1. Generally, driving torque is applied to jack shaft 36 through a right angle gearbox 50 from a PTO shaft 52, not completely shown, extending rearwardly from the tractor, shaft 36 functioning to drive the upper and lower conditioning rolls by chain drives 38, 40, the chain drives being adapted to rotating drive the two conditioning rolls in counter directions. Shaft 36 also drives the reel 12 through a pair of belts 42, 44 and an intermediate shaft 46, with belt 44 being trained around drive sheave 48 that is fixed to the main reel drive shaft. The cutter bar 28 is preferably driven by a conventional wobble drive unit, indicated generally by the numeral 29.

Turning to a detail description of the converging reel 12 and particularly to the first species as shown in FIGS. 2–5, it will be seen that the reel includes a main drive shaft 54 extending coaxially from one end of a support tube 56 having a primary axis 58. The main support tube 56 is fixed to the drive shaft 54, whereby the support tube is rotated upon the rotation of the shaft 54.

Mounted in general side by side relationship about the support tube 56 is a pair of reel sections 60, 62 (FIG. 1), each reel section including outer and inner laterally spaced spider assemblies indicated by numerals 64, 66 respectively. The basic construction of each spider assembly is identical, therefore, a description of one will suffice for all. Therefore, viewing FIGS. 2–5, it will be observed that each spider of each reel section includes a plurality of radially extending spider arms with each spider arm referred to by the numeral 68. In this particular case, it will be observed that each spider assembly includes four spider arms, each arm being angularly spaced 90 degrees from an adjacent spider arm. The outer and inner spider assemblies of each reel section are staggered relative to the outer and inner spider assemblies of the other reel section such that when viewed totally, the converging reel 12 has spider arms spaced at 45 degree intervals around the support tube 56.

The basic construction of each spider assembly comprises a series of arm mounts 70 circumferentially mounted to said support tube 56, each arm mount secured to a pair of mounting blocks 72 by a pair of bolt assemblies 74 as best seen in FIG. 3. Each arm 68 is pivotally mounted to respective arm mounts 70 for back and forth movement in the direction of the primary axis 58 of the reel support tube 56 by a pair of bushings 76, also best seen in FIG. 3.

Interconnected between corresponding spider arms 68 of each reel section is a series of tine bars, each tine bar denoted by the numeral 78 and rotatively mounted in each of the two arms it interconnects. Each tine bar includes a series of tines 80 fixed relative to the tine bar and extending normally radially therefrom relative to the reel assembly 12.

As previously pointed out, reel 12 is a converging reel particularly adapted to engage a relatively wide swath of crop material and converge it rearwardly into a narrower swath which can be accommodated by the relatively short conditioning rolls 32, 34. To accomplish this, the present invention utilizes a design concept that entails moving the spider arms of each reel section, and the tine bearing tine bars interconnecting these these arms, back and forth in the direction of the reel's main axis which is primary axis 58. More specifically, as each reel section is rotated about axis 58, it is desirable for each tine bar to be at an outward extreme position when they first engage the crop material and then to move rearward as the reel continues to rotate and the crop material is cut by the cutter bar 28, and then to move inwardly such that the crop material is converged inwardly into the rearwardly disposed conditioning rolls 32, 34. After each tine bar has reached its extreme inward position, it is then, of course, necessary to move that tine bar back to its outer extreme position during the remaining portion of the reel's cycle such that the converging operation may be performed on the next reel cycle.

To move the spider arms 68 and associated tine bars of each reel section between the inner and outer extreme position (or back and forth in the direction of axis 58) a cam structure 82 is fixed outwardly of each outer spider assembly 64 of each reel section 60, 62. The cam structure 82 is held in a stationary relationship relative to the reel 12 by the header side sheets 24. Referring to the cam structure 82 in detail, it is noted that a vertically open cam track 84 is wound around the cam structure with the front portion of each cam track 84, as viewed in FIG. 1, is disposed in a vertical plane while the rear portion is angled inwardly toward the outboard ends of the conditioning rolls 32, 34. Each spider arm 68 of the outer spider assemblies 64 has fixed thereto a cam following mechanism 86 including a roller 86a and roller support extension 86b, the rollers 86a being confined within cam track 84 of each cam structure. Therefore, as each arm of the outer spider assemblies 64 moves adjacent the rearward inwardly angle portion of the cam track 84, the particular arm and the corresponding arm of the inner spider of the respective reel section and tine bar interconnected therebetween is constrained to move inwardly, thereby converging the crop material. As the same spider arms and tine bar move upwardly and counterclockwise as viewed in FIG. 4, the same cam track 84 guides the arms and tine bars back outwardly to their outer extreme positions.

To obtain desirable crop feeding to the conditioning rolls 32, 34, it is necessary to retard the attitude of the tines 80 from their normal radial position as the tines pass in front of the conditioning rolls. The retarded attitude of the tines 80 enables the crop material carried thereby to more freely move from the tines into the intake area or throat of the rolls, and particularly avoids crop "carryover" which is most common with radial tines.

The manner of controlling the attitude of the tines 80 for the first species shown in FIGS. 1–5, particularly FIG. 2, comprised a series of actuating links 88 extending from the outer surface of the support tube 56 to a lever arm 90 fixed to each tine bar 78. As each tine bar 78 shifts back and forth, the distance between the respective lever arm 90 and the point of connection of the particular actuation links 88 with the tube 56 varies, thereby resulting in the lever arms pivoting the tine bars and necessarily varying the attitude of the tines 80. The tine tip path of this first species is shown in FIG. 5 and denoted by TP. With reference to FIG. 5 and the tine tip path, it will be observed that the inward angled portion of the cam track 84 generally extends half way (180°) around the cam structure 82. Also, in the first species an imaginary vertical line separating the angled portion of the cam track 84 from the vertical portion has been slightly rotated counterclockwise (FIG. 5) which has the effect of tipping the cam track 84 upwardly. Thus, as seen in FIG. 5, the retardation phase begins at the point where the cam track 84 begins to angle inwardly and continues through approximately 90 degrees of the reel's cycle. Maximum convergence occurs at approximately midway through the inward angled cam track 84, the point of maximum convergence being denoted by the point MC in FIG. 5.

Thus, it is appreciated that in the case of the first species maximum reel convergence occurs approximately the point when the tines have just completed the retardation phase and are ready to move back to the normal radial position. In at least some instances, it is desirable to coordinate reel convergence with tine retardation such the period of the retardation closely coincides with the point of maximum reel convergence. To accomplish this, applicant has devised a second species which is shown in FIGS. 6–9.

The second species includes the basic structure of the first species just described, with the exception of the tine attitude control mechanism. In the second species, the tine attitude control mechanism comprises a series of linkage structures interconnected between the inner spiders 66 of each reel section as shown in FIGS. 6 and 7. Basically the tine attitude control mechanism of the second species includes a lever arm 92 fixed to the inward end of each tine bar 78, and a connecting link 94 secured to an end of the lever arm 92 and extending generally inwardly therefrom in parallel relationship to the respective spider arms supporting the particularly tine bar. The parallel relationship between each connecting link 78 and a respective spider is of special significance and will be elaborated on later. An actuating arm 96 is fixed about one end to each spider arm of each inner spider 66 and has the other end connected to the inward end of the connecting link 78 associated with the preceding spider arm of the other inner spider. As previously noted, each spider assembly includes four arms and since the inner spiders are circumferentially staggered, the inner spider arms are spaced at 45 degree intervals about the reel support tube 56. The purpose of having the connecting links 78 parallel to their respective spider arms is to assure that the tine bar associated with the particular spider arm is not actuated by the back and forth movement of that spider arm; but is only actuated by the back and forth movement of a trailing spider arm which acts on the lever arms 92 through the connecting links 94 and actuating arms 96. Thus, it is seen that the tines of each tine bar are controlled by the delayed action of a trailing inner spider which, because of the spacing, does not effect the attitude of the tines until the tine bar and associated spider arms have moved approximately 45° into the angled cam track. Therefore, when compared to the first species, the second species simply delays the retardation phase approximately 45° and thereby tends to coordinate tine retardation with maximum reel convergence such that both occur generally within the same period of the reel's cycle. This is most clearly shown in FIG. 9 with the tine tip path being denoted by TP and the point of maximum convergence by MC.

Finally FIG. 7 shows an alternate shape for the spider arms which enables the various links to be conveniently interconnected between the inner spider arms. This particular shape gives adequate clearance about the intermediate portions of the arms and is readily adaptable to mass production through a metal stamping process.

Also, it should be pointed out that in the case of both species, the connecting points of the tine attitude control links preferably include ball joint connections since many of the links must move in two directions relative to another link.

The terms, "upper," "lower," "forward," "rearward" etc. have been used herein merely for the convenience of the foregoing specification and in the appended claims to describe the converging reel assembly having a tine control mechanism incorporated therein and its parts as oriented in the drawings. It is to be understood, however, that these terms are in no way limiting to the invention since the converging reel assembly having a tine control mechanism incorporated therein may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. A converging reel assembly having a tine attitude control mechanism incorporated therein, comprising in combination: a main support axis; and outer and inner spider rotatively mounted in axially spaced apart relationship about each side of said main support axis, each spider having a plurality of radially extending arms each pivotally secured about said main support axis for moving back and forth in the direction of said support axis; means for moving said spider arms back and forth in response to the rotation of said spiders about said support axis; tine bars extending between respective spider arms of each outer and inner spider; a series of tines secured to each tine bar and extending therefrom; and means for varying the attitude of the tines of each tine bar in response to the back and forth movement of a particular spider arm.

2. A converging reel assembly having a tine attitude control mechanism, as recited in claim 1, wherein said means for varying the attitude of the tines of each tine bar in response to the back and forth movement of a particular spider arm includes a linkage structure operatively interconnected between the tines of respective tine bars and a point radially spaced from said main support axis.

3. A converging reel assembly having a tine attitude control mechanism, as recited in claim 1, wherein said means for varying the attitude of the tines of each tine bar in response to the back and forth movement of a particular spider arm includes a linkage structure operatively interconnected between the tines of a particular tine bar and a spider arm.

4. A converging reel assembly having a tine attitude control mechanism, as recited in claim 1, wherein the outer and inner spider and the tine bars associated therewith on each side of said main support axis forms first and second reel sections, and wherein said means for varying the attitude of the tines of each tine bar in response to the back and forth movement of a particular tine comprises a linkage structure interconnected between the tines of each tine bar of each reel section and a particular arm of the inner spider of the other reel section.

5. A converging reel assembly having a tine attitude control mechanism, as recited in claim 4, wherein the spider arms of each reel section is staggered with respect to each other, and wherein said linkage structure operatively connected to the tines of each tine bar of each reel section is actuated by an adjacent spider arm of the inner spider of the other reel section.

6. A converging reel assembly having a tine attitude control mechanism, as recited in claim 1, wherein the tine bars are rotatively mounted between respective spider arms and have said tines fixed thereto, and wherein said tine bars include a lever arm fixed thereto and an actuating link interconnected between said lever arm and a point spaced from the main support axis for moving said lever arm and consequently rotating the tine bars and varying the attitude of the tines in response to the back and forth movement of the respective spider arms carrying the particular tine bar and tines.

7. A converging reel assembly having a tine attitude control mechanism, as recited in claim 1, wherein said means for moving said spider arms back and forth in response to the rotation of said spiders about said support axis includes a cam structure disposed adjacent each of said outer spiders and including a cam track with a portion thereof angled inwardly, and wherein each spider arm of said outer spiders includes a cam following mechanism fixed thereto and confined within the cam track of said cam structure, such that upon rotation of said spiders each reel arm is moved back and forth in the direction of the main support axis during the rotation of said spiders as the spider arms are constrained to follow the dictates of the cam following mechanism.

8. A converging reel assembly having a tine attitude control mechanism incorporated therein, comprising in combination: a plurality of spiders rotatively mounted in coaxial relationship about a transverse axis, each spider including a plurality of radially extending arms moveably mounted for back and forth movement in the direction of said axis, tine bars having tines extending therefrom interconnected between respective spiders, means for moving said spider arms back and forth in response to the rotation of said spiders, and means responsive to the back and forth movement of said spider arms for varying the attitude of said tines.

9. A converging reel assembly having a tine attitude control mechanism incorporated therein, as recited in claim 8, wherein said means for moving said spider arms back and forth in response to the rotation of said spiders comprises a cam means fixed relatively to said transverse axis, and a cam following mechanism interconnected between said cam means and the arms of at least one spider.

10. A converging reel assembly having a tine attitude control mechanism incorporated therein, as recited in claim 9, wherein said tine bars are rotatively mounted between respective reel spider arms and have the tines fixed thereto, and wherein said means responsive to the back and forth movement of said spider arms for varying the attitude of said tines comprises a lever arm fixed to each tine bar and an actuating link interconnecting said lever arm with a fixed point radially spaced from said transverse axis, whereby as the spider arms and associated tine bars move back and forth the distance between the lever arm and the point of connection spaced radially of the transverse axis varies, thereby causing the lever arm to be actuated and the attitude of the tines to be varied.

11. In an agricultural harvesting machine comprising a mobile frame, a header mounted within said mobile frame having cutting means disposed transversely therein for cutting a relatively wide swath of standing crop material, upper and lower conditioning rolls rotatively mounted transversely within said header, said conditioning rolls being of less width than the swath cut by said cutting means and disposed centrally therebehind such that the outboard ends of said conditioning rolls terminate inwardly of the outer extremities of said cutting means, the improvement comprising a converging reel for engaging the relatively wide swath of crop material and converging it inwardly into said conditioning rolls, said converging reel comprising a pair of coaxially spaced reel sections rotatively mounted in generally side by side relationship within said header about a transverse axis, each reel section including an outer and inner transversely spaced spider with each spider including a plurality of radially extending arms mounted for lateral back and forth movement in the direction of the transverse axis of said reel section, cam means disposed adjacent each outer spider and operatively engaged with each arm thereof for moving said arms back and forth laterally in the direction of the transverse axis of said reel sections as said spiders are rotated, tine bars rotatively connected between corresponding spider arms of each reel section, each tine bar having a series of tines secured thereto and depending therefrom, and linkage means connected to each of said tine bars and responsive to the lateral swinging movement of a particular spider arm for rotating the tine bar and varying the attitude of the tines depending therefrom.

12. A converging reel, as recited in claim 11 wherein said linkage means is interconnected between each tine bar and a trailing spider arm and is responsive to the trailing arm for varying the attitude of the particular tines of each tine bar, thereby providing a delayed reaction.

13. A converging reel assembly for a mower-conditioner having a tine control mechanism incorporated therein, comprising in combination: a mobile frame adapted to be propelled forwardly over the field; a header mounted within said mobile frame and having means disposed transversely therein for cutting a relatively wide swath of crop material; a floor plate mounted rearwardly of said cutting means and inclined upwardly therefrom; upper and lower conditioning rolls rotatively mounted transversely within said header and spaced generally above and rearwardly of said cutting means, said conditioning rolls being of less width than the swath cut by said cutting means and disposed centrally behind said cutting means such that the outboard ends of said upper and lower conditioning rolls terminate inwardly of the outer extremities of said cutting means; a converging reel assembly rotatively mounted above said cutting means and forwardly of said upper and lower conditioning rolls for engaging the relatively wide swath of crop material and sweeping it rearwardly past the cutting means where the crop material is cut, and continuing to sweep the cut crop material rearwardly up said floor plate while simultaneously converging the crop material inwardly into a narrow swath where the cut crop material is received by said conditioning rolls, said converging reel assembly including a pair of reel sections rotatively mounted in generally side by side relationship about an axis extending transversely of said header, each reel section having an outer and inner spider with each spider including a plurality of radially extending arms pivotally mounted about said transverse axis for back and forth movement in the direction of said axis; tine bars rotatively mounted between corresponding spider arms of each reel section with each tine bar including a series of tines extending therefrom, said tine bars being normally oriented such that the tines extend radially therefrom with respect to the reel assembly; means for moving said spider arms of each reel section back and forth in the direction of said transverse axis in response to the rotation of said reel assembly about said transverse axis, said means for moving said spider arms back and forth being adapted to move the spider arms inwardly as the crop material is swept past said cutting means and upwardly towards said conditioning rolls, thereby converging the crop material into a narrow swath, said means for moving said spider arms back and forth being further adapted to move the spider arms and associated tine bars outwardly as they return to engage another swath of crop material, the outward movement enabling the reel assembly to engage the relatively wide swath of crop material to be cut by said cutting means; and means responsive to the back and forth movement of selected spider arms for retarding the attitude of said tines from their normal radial attitude when said tines are located in the vicinity adjacent said conditioning rolls, thereby allowing the crop material to move more freely from said tines into said conditioning rolls.

14. A converging reel assembly for a mower-conditioner having a tine control mechanism incorporated therein, as recited in claim 13, wherein said means responsive to the back and forth movement of selected spider arms for retarding the attitude of said tines comprises a lever arm fixed to each tine bar and an actuating link connected between said lever arm and a point within said reel assembly, whereby as said spider arms and associated tine bars move back and forth the distance between said lever arm and said point varies, thereby causing said lever arm to be actuated which results in the change of attitude of the particular tines.

15. A converging reel assembly for a mower-conditioner having a tine control mechanism incorporated therein, as recited in claim 14, wherein said reel sections are secured to a main support tube which is rotatably mounted about said transverse axis, and wherein said actuating link is interconnected between said lever arm and a point on said main support tube.

16. A converging reel assembly for a mower-conditioner having a tine control mechanism incorporated therein, as recited in claim 13, wherein said means responsive to the back and forth movement of selected spider arms for retarding the attitude of said tines comprises an actuating linkage structure interconnected between one spider arm and the tine bar of a second spider arm such that the tines extending from the tine bar of said second spider arm is controlled by the movement of said one spider arm.

17. A converging reel assembly for a mower-conditioner having a tine control mechanism incorporated therein, as recited in claim 16, wherein said actuating linkage structure includes an actuating arm extending from said one spider arm and connected to a connecting link operatively connected to the tine bar associated with said second spider arm, and wherein said connecting link is disposed in a general parallel relationship with said second spider arm such that the tines of the tine bar associated with said second spider arm are not actuated by the movement of said second spider arm.

18. A converging reel assembly for a mower-conditioner, as recited in claim 17 wherein said spiders of each reel section are staggered and wherein said actuating linkage structure is interconnected between inner spider arms of each reel section, with each inner spider of each reel section controlling the tine attitude of the tines associated with a preceding inner spider of the other reel section, thereby delaying the retardation of the tines and tending to coordinate the tine retardation with maximum reel convergence to yield a desirable crop feeding pattern.

* * * * *